US008868898B1

(12) United States Patent
Van Hoof

(10) Patent No.: US 8,868,898 B1
(45) Date of Patent: Oct. 21, 2014

(54) BOOTABLE COVERT COMMUNICATIONS MODULE

(76) Inventor: Robert Van Hoof, Stedman, NC (US)

( * ) Notice: Subject to any disclaimer, the term of this patent is extended or adjusted under 35 U.S.C. 154(b) by 256 days.

(21) Appl. No.: 13/550,299

(22) Filed: Jul. 16, 2012

(51) Int. Cl.
*G06F 15/177* (2006.01)
*G06F 9/00* (2006.01)
*G06F 21/00* (2013.01)
*G06F 12/14* (2006.01)
*G06F 7/04* (2006.01)
*G06F 11/00* (2006.01)
*G06F 21/57* (2013.01)

(52) U.S. Cl.
CPC .......... *G06F 21/572* (2013.01); *G06F 12/1408* (2013.01)
USPC ................... 713/2; 713/1; 713/182; 713/189; 710/200; 710/305; 726/2; 726/22; 726/26

(58) Field of Classification Search
USPC .................. 713/1, 2, 182, 189; 710/200, 305; 726/2, 22, 26
See application file for complete search history.

(56) References Cited

U.S. PATENT DOCUMENTS

| 5,629,508 | A | * | 5/1997 | Findley et al. | 235/382 |
| 8,667,576 | B2 | * | 3/2014 | Lin et al. | 726/16 |
| 2006/0174100 | A1 | * | 8/2006 | Park | 713/2 |
| 2007/0136593 | A1 | * | 6/2007 | Plavcan et al. | 713/172 |
| 2010/0228991 | A1 | * | 9/2010 | Billings et al. | 713/185 |
| 2013/0145139 | A1 | * | 6/2013 | Adam et al. | 713/2 |

* cited by examiner

*Primary Examiner* — Stefan Stoynov
(74) *Attorney, Agent, or Firm* — Michael I. Kroll

(57) ABSTRACT

A method for a covert communication system comprising a pair of flash memory devices having encrypted boot instructions and communication software thereon whereby the flash memory devices once plugged into a computer's USB ports and the computer is powered on, the flash memory boot load tests for the presence of a flash memory device dongle having an encrypted key that that once validated starts the encrypted communication software designed to create, edit, send and receive a report comprising data files forming a data package, which can only be transmitted by restarting the computer.

1 Claim, 8 Drawing Sheets

BOOTABLE COVERT COMMUNICATIONS MODULE

BACKGROUND OF THE INVENTION

1. Field of the Invention

The present invention relates generally to covert secure communications and, more specifically, to a method of covert communication using any Internet connected public or untrusted computer enabled with a pair of data encrypted mass storage modules of the present invention incorporating computer boot function, security function, data destruct function, data encryption function, create and send encrypted data reports.

The present invention further envisions a covert secure communications system that optionally provides an unencrypted data artifact that under cursory examination gives the appearance of a typical mass storage module while masking the presence of the encrypted secure communications system.

Preferably, the pair of encrypted mass storage modules are USB flash drives that function in tandem to enable the secure communications system by booting from the USB's boot startup, which will test for the presence of a dongle key match before initiating login to the secure communications system. Should the dongle key match fail the computer will not boot and after a designated number of login failures a data destruction function is initiated prior to system shut down.

After dongle key match and user login a GUI interface provides the user with simple means for creating a report, uploading data files, creating a data package, opening a data package and sending/receiving a data package.

The method and system combines hardware and encrypted tamper-proof communications software providing a graphical user interface (GUI) for signing on and off of the system for creating, editing, sending and receiving encrypted data file packages.

2. Description of the Prior Art

There are other bootable hardware devices designed for computers. Typical of these is U.S. Pat. No. 6,920,553 issued to Poisner on Jul. 19, 2005

Another patent was issued to Burke et al. on May 9, 2006 as U.S. Pat. No. 7,043,587. Yet another U.S. Patent Application Publication No. 2007/0199058 was published to Baumgart et al. on Aug. 23, 2007 and still yet another was issued on Feb. 26, 2008 to Cochran as U.S. Pat. No. 7,337,323.

Another patent was issued to Chen on Dec. 16, 2008 as U.S. Pat. No. 7,457,290. Yet another U.S. Pat. No. 7,478,235 was issued to England et al. on Jan. 13, 2009. Another was published to Lee on Dec. 24, 2009 as U.S. Patent Application Publication No. 2009/0319782 and still yet another was issued on Jul. 27, 2010 to Lee et al. as U.S. Pat. No. 7,765,393.

Another patent was issued to Roberts et al. on May 17, 2011 as U.S. Pat. No. 7,945,788. Yet another U.S. Pat. No. 8,024,790 was issued to Zhao et al. on Sep. 20, 2011. Another was issued to Teng on Oct. 6, 2004 as U.K. Patent No. GB2400214 and still yet another was issued on Aug. 11, 2010 to Kangqing as Chinese Patent No. CN201549223.

U.S. Pat. No. 6,920,553

Inventor: David I. Poisner

Issued: Jul. 19, 2005

In one embodiment, a design is described for providing the BIOS instructions to a computer through the USB port. At boot-up, a USB controller checks the USB port for a bootable device containing BIOS instructions. If a bootable device is connected, the USB controller transfers the BIOS instructions through the USB port to the processor. The computer then boots-up using the USB boot instructions. If no bootable device is connected to the USB port, the computer looks to a standard BIOS EPROM for boot instructions.

U.S. Pat. No. 7,043,587

Inventor: Thomas Charles Burke et al.

Issued: May 9, 2006

A method and system for controlling the addition of a USB device to a host computer system via a hardware hot plug detector that monitors USB ports. The differential signal lines connecting to the USB device are logically OR'ed together, such that logically high D+ or D− signals from the USB device signal a central processing unit's (CPU) system management interrupt (SMI) line to initiate system management mode (SMM). Entering SMM transfers control of the host computer system to an SMI Interrupt Handler BIOS, which resides in the SMM address space of the hose computer system. The SMM BIOS is loaded into the SMM address space during Power On Self Test (POST) and is secured prior to booting the Operating System (OS). The SMM BIOS code contains instructions as to whether or not the connected USB device should be made visible to the operating system of the computer. If the device is not authorized, it is disabled, the D+/D− lines are not connected to the USB host controller, and the SMI signal is cleared, allowing the computer to continue operation without the operating system ever being aware of the USB device.

U.S. Patent Number 2007/0199058

Inventor: Rainer Hans Frederich Baumgart et al.

Published: Aug. 23, 2007

A security token is scanned by a pure reader that is connected to a computer. This immediately loads from the token into the computer a virtual machine having a virtual operating system. Then an identification/authentication code is entered via a peripheral of the computer, whereupon data can be exchanged between the security token and the virtual operating system, and thence exchanged between the virtual operating system and a remote location.

U.S. Pat. No. 7,337,323

Inventor: Michael Lloyd Cochran

Issued: Feb. 26, 2008

A method and apparatus for booting a computer. The method comprises the steps of emulating a floppy disk drive communicatively coupled to a computer in a token via a USB-compatible interface, and booting the computer using the token. The apparatus comprises means for performing these functions, including a token with a processor having one or more memories storing processor instructions and data for performing the method steps. The memory may also securely store sensitive data.

U.S. Pat. No. 7,467,290

Inventor: Ben Wei Chen

Issued: Dec. 16, 2008

A method and system for providing a modular server-on-a-USB-flash-storage is disclosed. The server-on-a-USB-flash-storage is installed on a computing device. The method and system include providing USB interface logic, USB Local Control Program, a flash memory and a set of control button connectors, light emitting diodes (LED) connectors and a liquid crystal display (LCD) connector. The USB Local Control Program is coupled with the USB interface logic and the flash memory. The USB interface logic interacts with the computing device and allows the computing device to detect the server board. The USB Local Control Program boots up the server and prepares the computing device for use as the server. The flash memory stores a server image for the server, which is provided to the computing device using the USB Local Control Program. The control button connectors allow the server to be turned on, shut down gracefully, or restored to its initial state, by a single press of buttons connected to these connectors. The LED and LCD connectors allow the system status to be displayed or shown. Different server images can be installed onto the same computing device, be it a workstation, a PDA or a notebook computer, by simply swapping in and out the USB flash storage while the computing device is still running or "hot."

U.S. Pat. No. 7,478,235

Inventor: Paul England et al.

Issued: Jan. 13, 2009

The various embodiments described below are directed to providing authenticated and confidential messaging from software executing on a host (e.g. a secure software application or security kernel) to and from I/O devices operating on a USB bus. The embodiments can protect against attacks that are levied by software executing on a host computer. In some embodiments, a secure functional component or module is provided and can use encryption techniques to provide protection against observation and manipulation of USB data. In other embodiments, USB data can be protected through techniques that do not utilized (or are not required to utilize) encryption techniques. In accordance with these embodiments, USB devices can be designated as "secure" and, hence, data sent over the USB to and from such designated devices can be provided into protected memory. Memory indirection techniques can be utilized to ensure that data to and from secure devices is protected.

U.S. Patent Application Number 2009/0319782

Inventor: Richard M. Lee

Published: Dec. 24, 2009

Disclosed are interconnectable personal computer architectures comprising secure, portable and persistent computing environments that provide secure computing sessions with persistence. The computing environments are implemented using a secure non-computing client device, such as a USB device, that interfaces with a host computer and, optionally, a trusted server. The secure non-computing client device is used to instantiate a secure BIOS and a secure cold or warm boot of the host computer, from the client device, in a host protected area of the host computer, or from the trusted server. The client device comprises a security device, such a trusted platform module, that encrypts and decrypts data transferred between the client apparatus and the host computer to provide a sealed computing environment on the host computer. The client device may implement keyboard logger attack prevention. The client device may also implement a high assurance guard to protect applications. The client device may also comprise security wrapper software that encapsulates malware processed by the host computer. Computing methods and software are also disclosed.

U.S. Pat. No. 7,765,393

Inventor: Min Eig Lee

Issued: Jul. 27, 2010

An IBM PC compatible processing system typically has a BIOS installed as system firmware. During a boot process of the processing system, the BIOS loads a boot loader from one of the boot media, i.e., hard drives, floppy disks, CDs, USB flash memories, taps, etc. and passes control of the boot loader, the boot loader then loads an OS from the boot media. The present invention takes advantage of the higher reliability and availability provided by the system flash memory and stores a boot loader as system firmware in the system flash memory. Further, it provides changes in the BIOS boot process to load the boot loader from system memory, the ROM, for example, without relying on boot media. With this new process, the boot loader can be loaded even when the boot media is corrupt, defective or un-initialized.

U.S. Pat. No. 7,945,788

Inventor: Rodney B. Roberts et al.

Issued: May 17, 2011

A removable drive such as a USB drive or key is provided for connecting to computer devices to provide secure and portable data storage. The drive includes a drive manager adapted to be run by an operating system of the computer device. The drive manager receives a password, generates a random key based on the password, encrypts a user-selected data file in memory of the computer device using the key, and stores the encrypted file in the memory of the removable drive. The drive manager performs the encryption of the data file without corresponding encryption applications being previously loaded on the computer system. The drive manager may include an Advanced Encryption Standard (AES) cryptography algorithm. The drive manager generates a user interface that allows a user to enter passwords, select files for encryption and decryption, and create folders for storing the encrypted files on the removable drive.

U.S. Pat. No. 8,024,790

Inventor: Xiaoming Zhao et al.

Issued: Sep. 20, 2011

A portable secured computing environment for performing online confidential transactions in an untrusted host computer. The secured computing environment may be loaded from a portable storage device, such as a USB stick, plugged into a peripheral port of the host computer. The secured computing environment may include a virtual machine running under a host operating system of the host computer. A secured operating system may be running in the virtual machine. An online application, such as a web browser in communication with an online service, may be run under the secured operating system. Operation of the online application may be restricted by a security profile. For example, the online application may only access network addresses specifically indicated in a whitelist of the security profile.

U.K. Patent Number GB2400214

Inventor: Teng Pin Poo

Published: Oct. 6, 2004

An operating system (22) is loaded into a computer RAM (16) from a solid state storage device (20) connected to an interface (18) and configured as a boot drive. The storage device also includes a boot program (24) and may be used to load the operating system to a plurality of computers. The device may be a CompactFlash card, a Secure Digital card, a memory stick or a Thumbdrive. The interface may be a USB, CompactFlash, Firewire, Secure Digital or memory stick I/O interface. A driver may also be provided on the device to adapt the interface to a SCSI. In use, the BIOS of a computer system (14) locates a boot program (60) based on a boot sequence in which the device is the first boot device. A boot program is then loaded (62) and the operating system (22) copied to the computer RAM (16). On completion of copying, control is passed to the operating system (66). If no boot program is found on the external device or the device is not connected the boot sequence looks at the next device in the sequence.

China Patent Number CN2015549223

Inventor: Kangqing Li

Published: Aug. 11, 2010

A trusted secure portable storage device relates to the technical field of information security and comprises a portable storage device and a trusted computing device mutually connected with the portable storage device. The portable storage device includes an access control unit, a cryptography service unit, a data storage unit and a USB interface and can be in identity binding with the trusted computing device in manners of digital signature and signature verification. The trusted computing device comprises a trusted application program, a trusted OS Kernel, a trusted Boot Loader, a trusted BIOS/EFI and a trusted cryptographic module TCM which are mutually connected, wherein the trusted cryptography module TCM is a trusted root of the trusted computing device, and a trusted computing environment is built based on the trusted root. Compared with the prior art, by arranging the identity binding of the portable storage device and the trusted computing device, the trusted secure portable storage device ensures that data in the portable storage device can only flow within local range, and effectively prevents data leakage.

While these bootable hardware devices may be suitable for the purposes for which they were designed, they would not be as suitable for the purposes of the present invention, as hereinafter described.

SUMMARY OF THE PRESENT INVENTION

A primary object of the present invention is to provide a covert communication module that will interface with any computer having Internet access and enabled with universal serial bus protocol ports to establish a platform for sending and receiving encrypted data packages.

Another object of the present invention is to provide a covert communications module incorporating portable hardware component and encrypted software for establishing a secure covert communication link between a computer and a remote communications device.

Yet another object of the present invention is to provide a communications module providing at least one portable data storage device as the portable hardware component for said communication module.

Still yet another object of the present invention is to employ USB flash drive for said portable data storage device.

A further object of the present invention is to provide a pair of portable data storage devices as the hardware component for said communication module.

A yet further object of the present invention is to employ a pair of USB flash drives for said portable data storage devices.

A still yet further object of the present invention is to provide encrypted communications module software that uses a dongle to prevent unauthorized access of the secure communications module software.

An additional object of the present invention is to provide a secure covert communication system with a self-destruct sequence that is triggered when a predetermined number of failed account sign in attempts triggers deletion of all data returning the USB flash drive to a blank storage device.

Another object of the present invention is to provide a pair of USB flash drives with one serving as dongle used in performing security pass code query that if failed a predetermined number of times would trigger deletion of all data on the USB drive returning it to a blank data storage device.

Yet another object of the present invention is to provide a boot program on the USB flash drive as boot sector for enabling the secure communications system.

Still yet another object of the present invention is to provide the portable secure communications system on a USB flash drive.

A further object of the present invention is to provide USB flash drive enabled with encrypted boot software and GUI operated passkey.

A yet further object of the present invention is to provide USB flash drive enabled with GUI interface to create, send and receive data packages.

A still yet further object of the present invention is to provide a covert secure communication system that sends and receives said data packages only during computer boot sequence after key handshake verification.

Additional objects of the present invention will appear as the description proceeds.

The present invention overcomes the shortcomings of the prior art by providing a system and method of covert communication using any Internet connected computer enabled with a pair of data encrypted mass storage modules of the present invention, preferably USB flash drives, having computer executable instructions for computer boot function, security function, data destruct function, data encryption function, create and send encrypted data reports.

Working in tandem, the pair of USB flash drives enable the secure communications system by booting from the USB's boot startup, which will test for the presence of a dongle key match before initiating login to the secure communications system. After dongle key match and user login a GUI interface provides the user with simple means for creating a report, uploading data files, creating a data package, opening a data package and sending/receiving a data package.

Should the dongle key match fail the computer will not boot and after a designated number of login failures a data destruction function is initiated prior to system shut down.

The method and system combines hardware and encrypted tamper-proof communications software providing a graphical user interface (GUI) for signing on and off of the system for creating, editing, sending and receiving encrypted data file packages.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
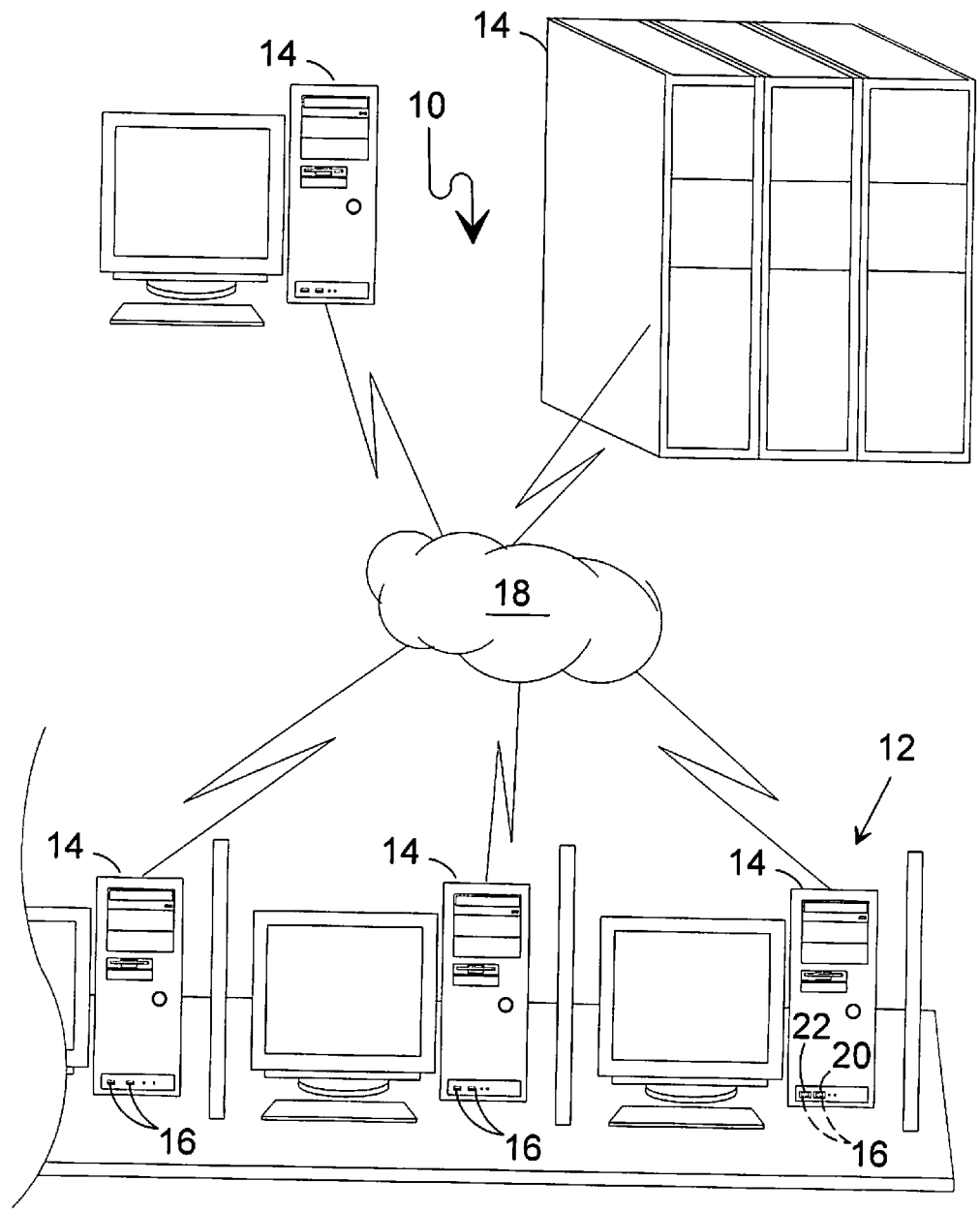
FIG. 1 is an illustrative view of the present invention in use.

Turning now descriptively to the drawings, in which similar reference characters denote similar elements throughout the several views, the Figures illustrate the covert communications system of the present invention. With regard to the reference numerals used, the following numbering is used throughout the various drawing figures.
10 covert communication system
12 computer cafe
14 computer
16 USB port
18 Internet
20 OPSusb
22 dongle
24 system ready
26 application interface
28 create report
30 upload files
32 create package
34 send/receive package
36 open package
38 updates
40 encrypted operating system
42 encrypted storage partition
44 encrypted operating system 2
46 dongle boot sector
48 OPSusb boot sector
50 files in package
52 operating system 2 send then reboot
54 FAT storage
56 pkg1 encryption keys

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the present invention in use. The present invention provides a method and system for a covert communication system 10 from any computer, such as an Internet cafe 12, having USB ports 16 and Internet access 18. The system provides a pair of USB storage devices 20, 22 that work in concert to enable the secure communications system 10 by booting from the USB's 20 boot sector, which will test for the presence of a USB dongle key match before initiating login to the secure communications system 10. Should the USB dongle key match fail the computer will not boot and after a designated number of login failures a USB 20, 22 data destruction function is initiated prior to system shut down. The secure communications system provides a boot startup and application software that circumvents the computer's installed operating system therefore no record of the communication would be present within the computer's default operating system.

Figure 2:
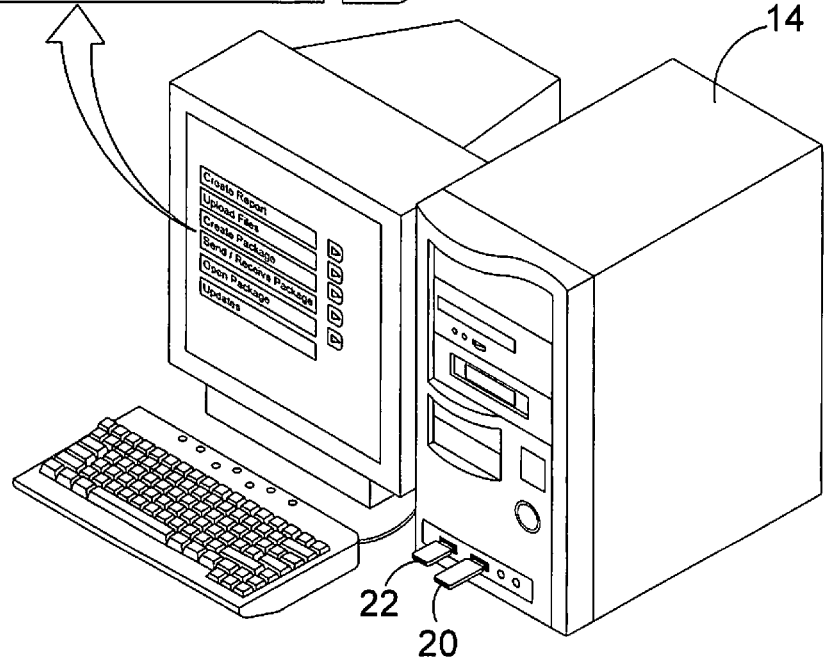
FIG. 2 is an illustrative view of the application interface.

Referring to FIG. 2, shown is an illustrative view of the application interface. The present invention provides an application interface for the functions of creating a report 28, that involves uploading files 30, then creating a package 32, sending and receiving a package 34, opening a package 36, and receiving updates 38, Further provided is hot key means for showing or hiding the application interface, such as the F1 key.

Figure 3:
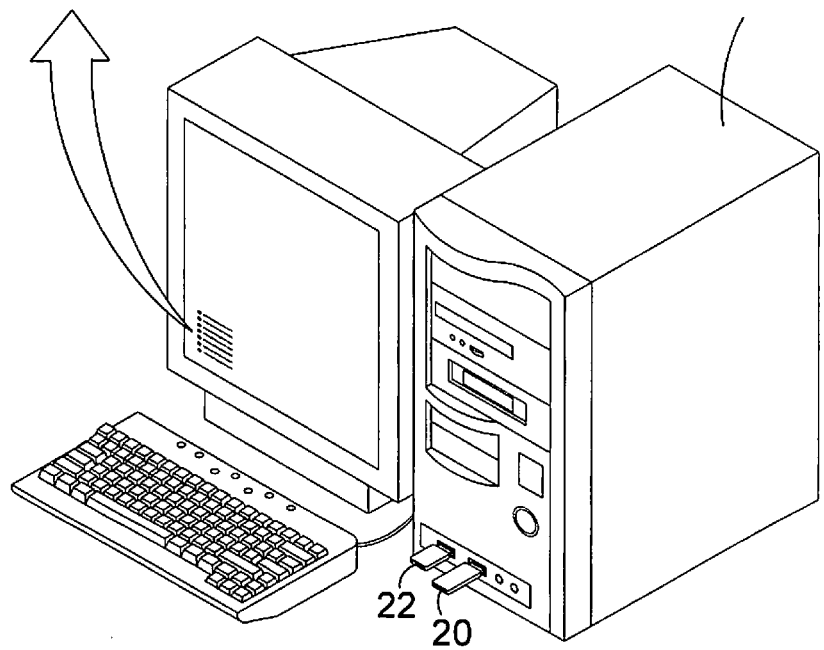
FIG. 3 is an illustrative view of an additional element of the present invention.

Referring to FIG. 3, shown is an illustrative view of an additional element of the present invention. The present invention further envisions an application interface inside of the HTML help file having the similar functions of creating a report—Create a report by using the report tool 28, uploading files—Adding files or photo to your report 30, finalizing your report 30, sending or receiving a report 32, receiving a report 34, opening received files 36, and checking for updates 38, Further provided is hot key means for showing or hiding the application interface, such as the F1 key.

Figure 4:
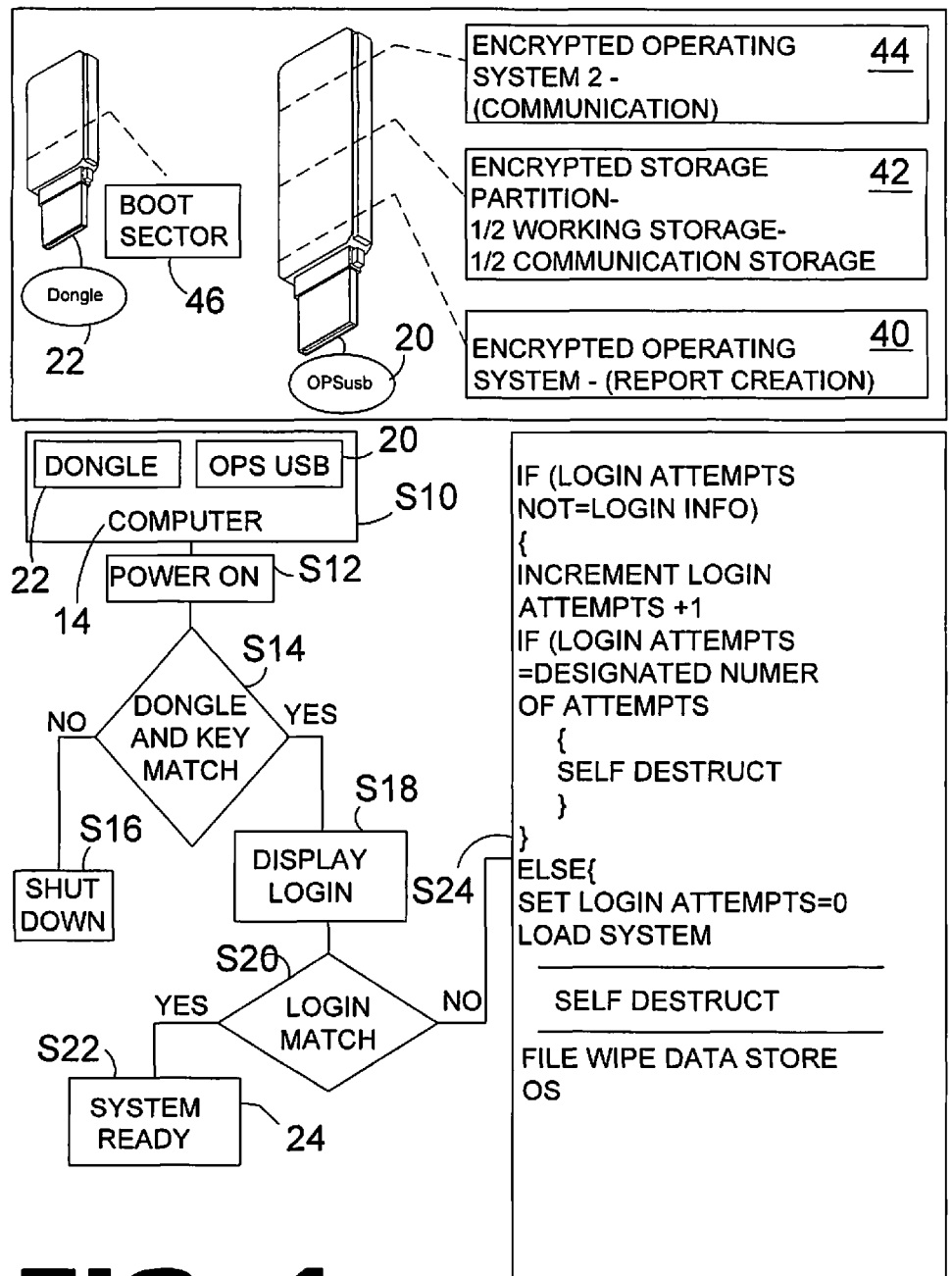
FIG. 4 is a chart view of the start procedure for the covert communications system.

Referring to FIG. 4, shown is a chart view of the start procedure for the covert communications system. The present invention provides a pair of encrypted USB mass storage modules 20, 22 that function together to enable the secure communications system. Both of the USB drives are plugged into any computer 14, as shown in step S10. In step S12 the computer is powered on which is then booted from the Dongle USB boot sector 46 wherethen the key match is performed, as shown in step S14. If the keys don't match, the system will shut down, as shown in Step S16. Shown in Step S18, if there is a key match the application queries for a login, which if successful as shown in step S22 continues with the system ready application interface. If the login failed, as shown in step S24, the application again queries for the login information. If the login fails after a designated number of login attempts, a self destruct sequence is initiated that deletes all application software and data files returning the USB devices 20, 24 to a typical mass storage device.

Figure 5:
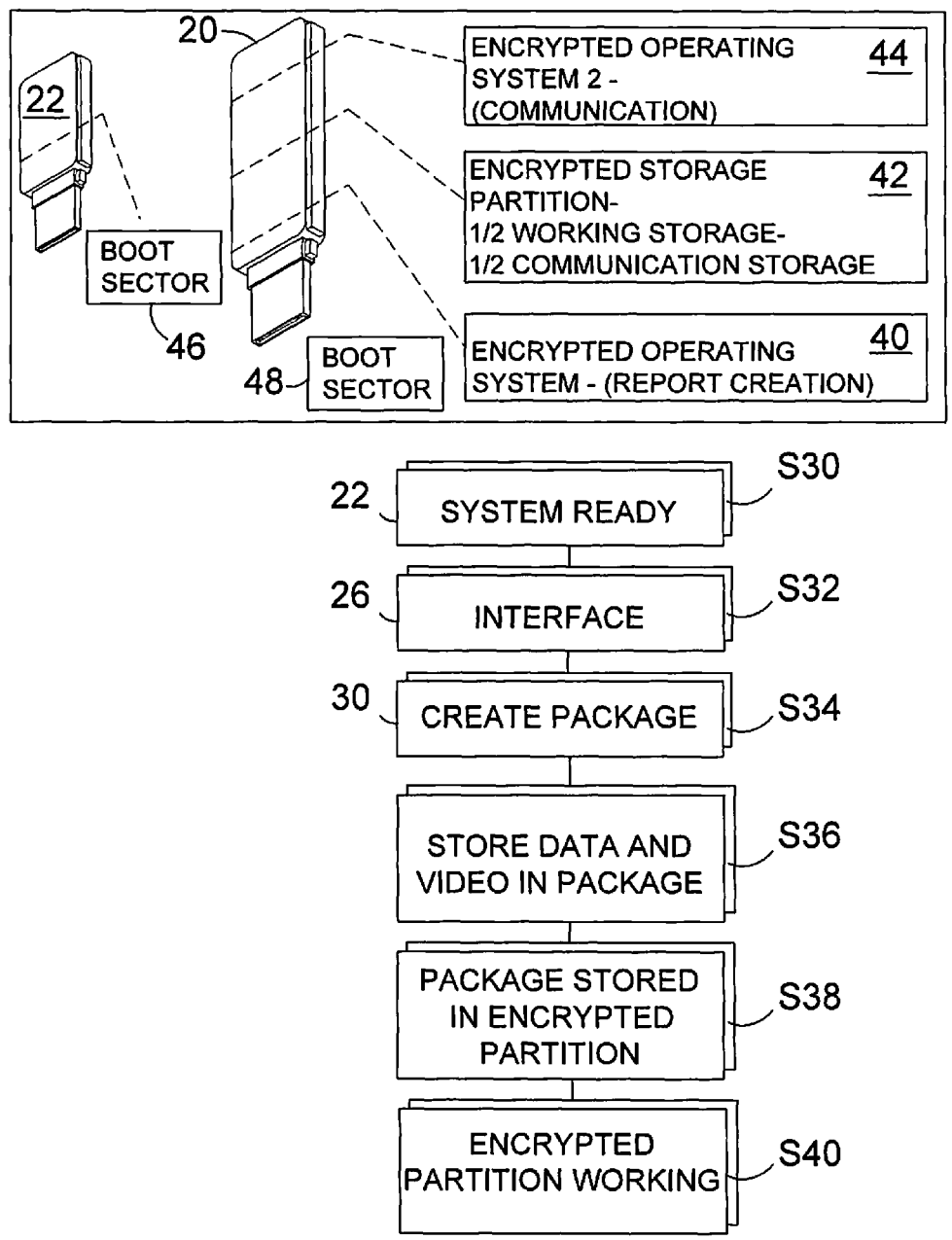
FIG. 5 is a chart view of the application interface of the covert communications system.

Referring to FIG. 5, shown is a chart view of the application interface of the covert communications system. Depicted are OPSusb device 20 having boot sector 48, a second encrypted operating system 44 that is used to initiate communication of reports contained within encrypted storage partition 42 and an encrypted operating system 40 that is used for report creation. Dongle USB 22 contains boot sector 46 used to initiate startup of the covert communication system. Also shown is a stepwise chart for package creation. Step S30 establishes that the system is ready 22 through verification of mating keys on USB devices 20, 22 and that the user login is correct. Wherethen, application interface 26 is displayed in step S32. The selection of the application interface option create package 30, in step S34 enables the selection of data and media to be included in the package, step S36. In step S38, when the package data and media is complete, the package is stored in the encrypted storage partition and the encrypted partition is working, as shown in step S40.

Figure 6:
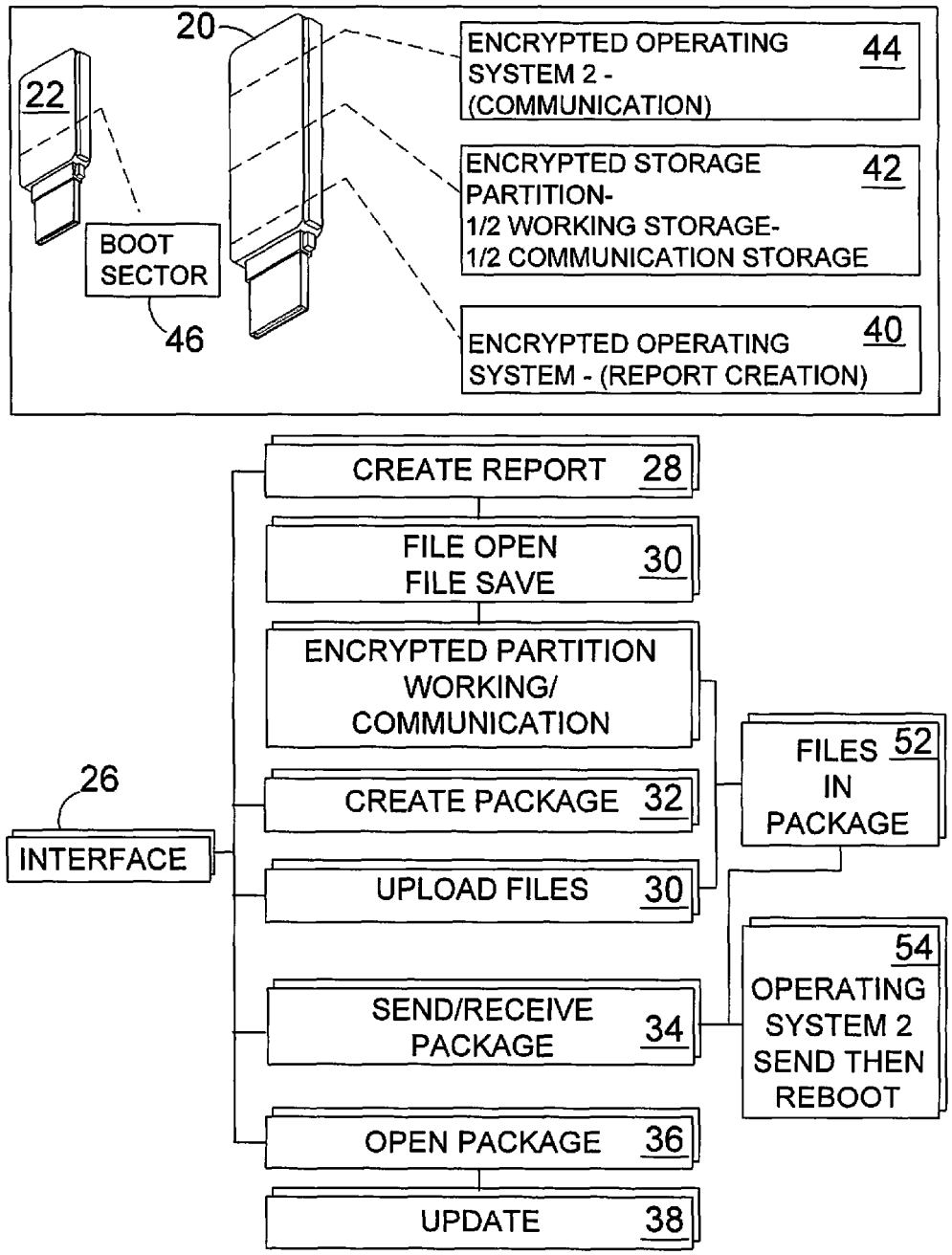
FIG. 6 is a chart view of the create report function of the application interface.

Referring to FIG. 6, shown is a chart view of the application processing for the covert communication system having a package in the encrypted storage partition. The present invention provides a pair of key mating USB storage devices 20, 22 having application software incorporating a login providing access to an application interface 26 for creating a report 28, uploading files 30, creating a package 32, sending and receiving packages 34, opening packages 36 and checking for updates 38. As illustrated, creating a report 28 provides for opening and saving files 30 in the encrypted storage partition 42. Also for uploading files 30 into the encrypted storage partition 42. Once the data and/or media is contained within encrypted storage partition 42, a package can be created 32 for transmission, which will be transmitted upon rebooting the computer whereupon operating system two having a package will send the package upon system reboot.

Figure 7:
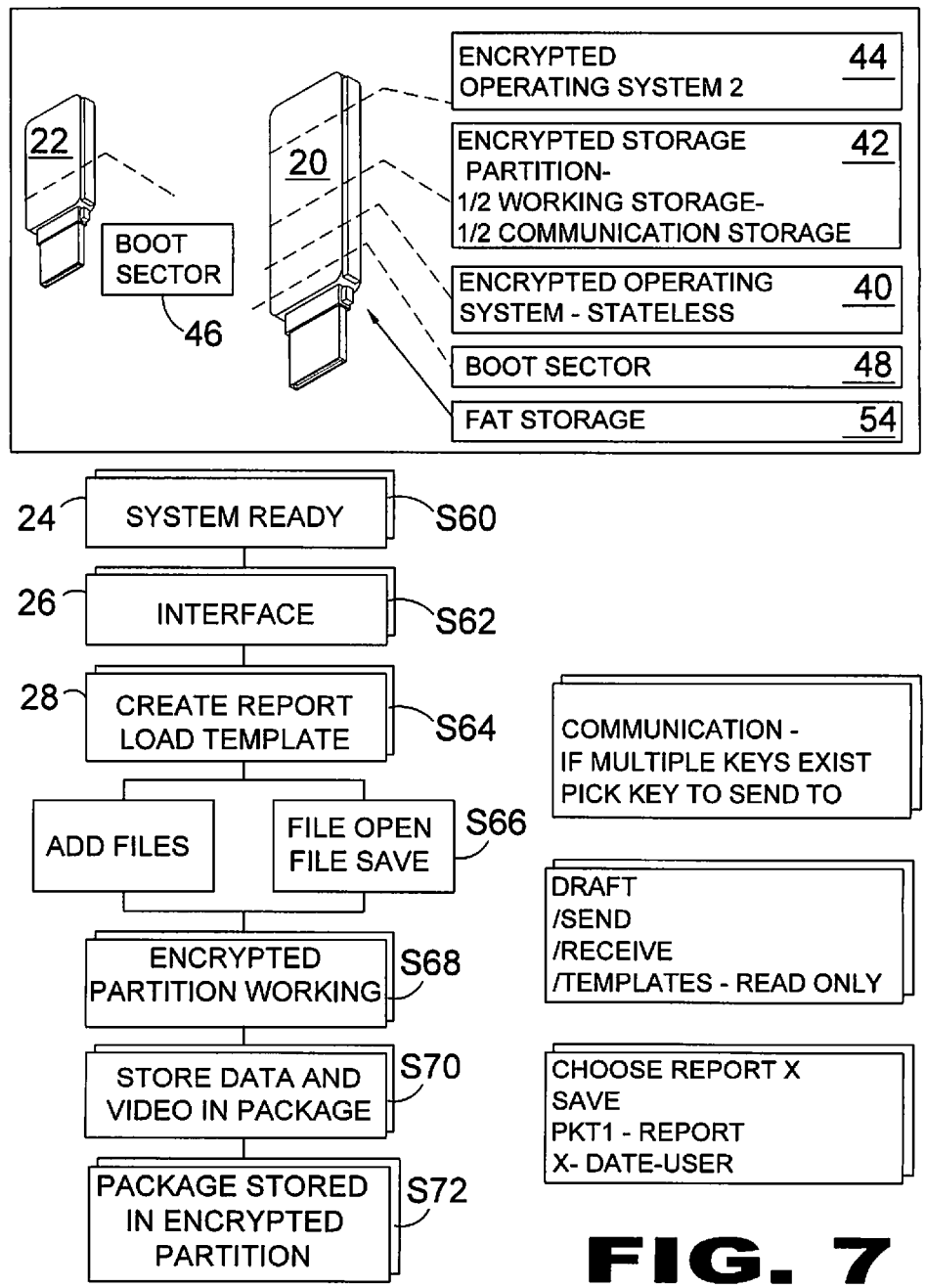
FIG. 7 is a chart view of an additional element for creating a report having multiple keys.

Referring to FIG. 7, shown is a chart view of an additional element for creating a report having multiple keys. Depicted are OPSusb device 20 having boot sector 48, a file allocation table (FAT) 54, a second encrypted operating system 44 that is used to initiate communication of reports contained within encrypted storage partition 42 and an encrypted operating system 40 that is used for report creation. Dongle USB 22 contains boot sector 46 used to initiate startup of the covert communication system. Also shown is a stepwise chart for creating a report 28. Step S60 establishes that the system is ready 22 through verification of mating keys on USB devices 20, 22 and that the user login is correct. Wherethen, application interface 26 is displayed in step S62. In step S64, the selection of the application interface option create report provides a plurality of report templates 30, whereby files are added through file open, file save, shown in step S66, which are stored in the encrypted storage partition, step S68. In step S70, the data and media is stored in a package and the package is stored in the encrypted storage partition, step S72, for later transmission by rebooting the computer. Also provided for is a plurality of keys, where one of said plurality of keys is selected as the recipient of the package.

Figure 8:
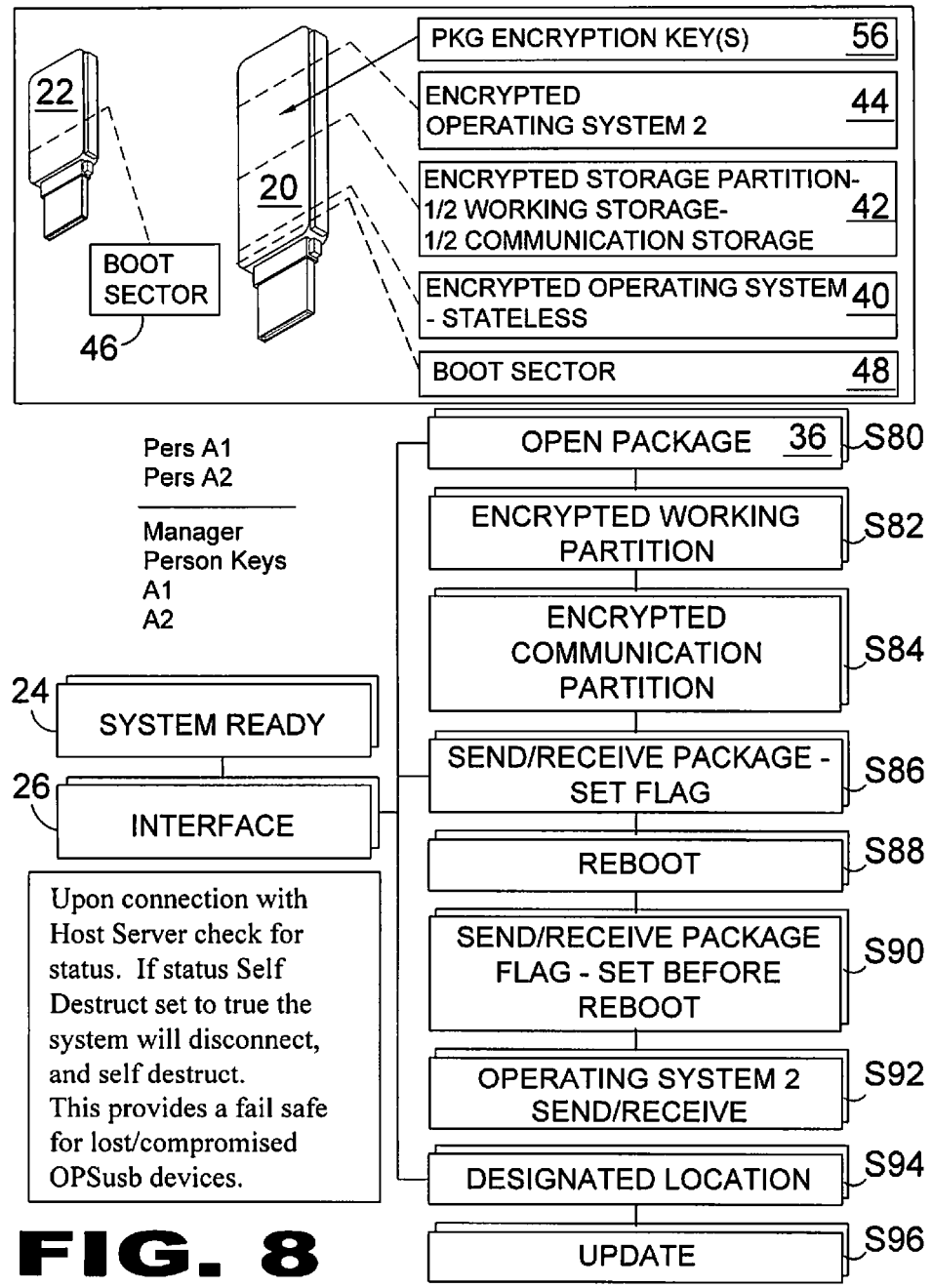
FIG. 8 is a chart view exemplifying the open package having multiple keys.

Referring to FIG. 8, shown is a chart view exemplifying the open package having multiple keys. Upon connection with Host Server check for status. If status Self Destruct set to true the system will disconnect, and self destruct. This provides a fail safe for lost/compromised OPSusb devices. OPSusb device 20 having boot sector 48, PKG1 encryption keys 56, a second encrypted operating system 44 that is used to initiate communication of reports contained within encrypted storage partition 42 and an encrypted operating system 40 that is used for report creation. Dongle USB 22 contains boot sector 46 used to initiate startup of the covert communication system. As aforementioned, system ready 24, is established through verification of mating keys on USB devices 20, 22 and successful user logon then application interface 26 is displayed. From the application interface 26 open package 36 is selected, as shown in step S80, which is contained in the encrypted working partition, shown in step S82 by means of the encrypted communications partition, step S84. In the application interface function send/receive package a flag is set, step S86, then the computer is rebooted in step S88 evoking operating system two, which resets the send/receive set flag in step S90 then operating system two, in step S92, sends or receives a package from a designated location, as shown in step S94, which also checks for updates in step S96.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for providing a covert communication system from any computer comprising:
   a) providing a first USB storage device having encrypted software thereon wherein said software comprises an encrypted operating system and encrypted communication application software;
   b) providing a second USB storage device as a dongle having a passcode thereon, said second USB device having a boot sector;
   c) said computer having Internet access and enabled with a pair of USB ports capable of receiving said USB storage devices therein;
   d) plugging both said USB devices into said computer prior to powering on said computer;
   e) said computer booting from the second USB storage device boot sector, wherein said encrypted communications application software initially verifies the authenticity of USB devices through mating security keys, and said encrypted communications application software provides a login procedure once authenticity of said USB devices is authenticated;

e) and wherein said encrypted communications application software provides a login procedure with a data destruct function that is executed after a predetermined number of login failures;
f) said encrypted communications application software providing a GUI interface once login authenticity is verified, said GUI interface providing means for creating a report, uploading files, creating a communications package, sending and receiving said package, and opening said package and package updates; and
g) wherein said communications package sent and receive transmission requires a system restart to execute said send and receive function.

\* \* \* \* \*